United States Patent [19]

Vaughan, III

[11] 4,069,977

[45] Jan. 24, 1978

[54] JET ENGINE TAIL PIPE FLOW DEFLECTOR

[75] Inventor: John C. Vaughan, III, Poquoson, Va.

[73] Assignee: The United States of America as represented by the Secretary of the Air Force, Washington, D.C.

[21] Appl. No.: 685,210

[22] Filed: May 11, 1976

[51] Int. Cl.$^2$ .................. B63H 25/46; B64C 15/10
[52] U.S. Cl. .................. 239/265.23; 244/52; 244/100 A
[58] Field of Search ......... 244/52, 51, 42 CC, 42 CD, 244/100 A, 207; 239/265.17, 265.19, 265.23

[56] References Cited

U.S. PATENT DOCUMENTS

| 3,606,165 | 9/1971 | Dunaway | 239/265.23 |
|---|---|---|---|
| 3,628,726 | 12/1971 | Johnson et al. | 239/265.17 |
| 3,759,039 | 9/1973 | Williams | 239/265.23 |
| 3,995,662 | 12/1976 | Fitzgerald et al. | 239/265.23 |

FOREIGN PATENT DOCUMENTS

| 2,315,699 | 12/1973 | Germany | 244/100 A |

*Primary Examiner*—Trygve M. Blix
*Assistant Examiner*—Charles E. Frankfort
*Attorney, Agent, or Firm*—Joseph E. Rusz; James S. Shannon

[57] ABSTRACT

Apparatus for producing a component of thrust at right angles to the main thrust direction of a jet engine. The apparatus comprises a deflecting device which provides a surface, bounded by side walls normal to the surface, that curves outwardly from tangency to the main thrust direction at the tail pipe edge. A series of control ports extending transversely of the curved surface at the point of tangency are connected to ambient air pressure through a normally open remotely controlled air valve. Closure of the air valve causes that portion of the jet stream adjacent to the curved surface to follow the surface because of the Coanda effect, thus producing a thrust component normal to the main jet stream. The device is particularly useful for yaw control of air cushion equipped jet powered aircraft when taxiing and during the low speed portions of takeoff and landing runs.

3 Claims, 6 Drawing Figures

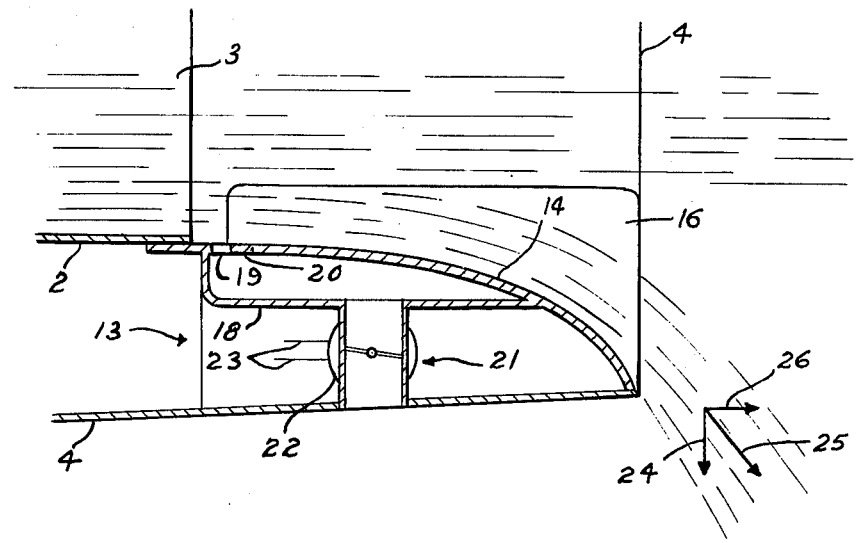
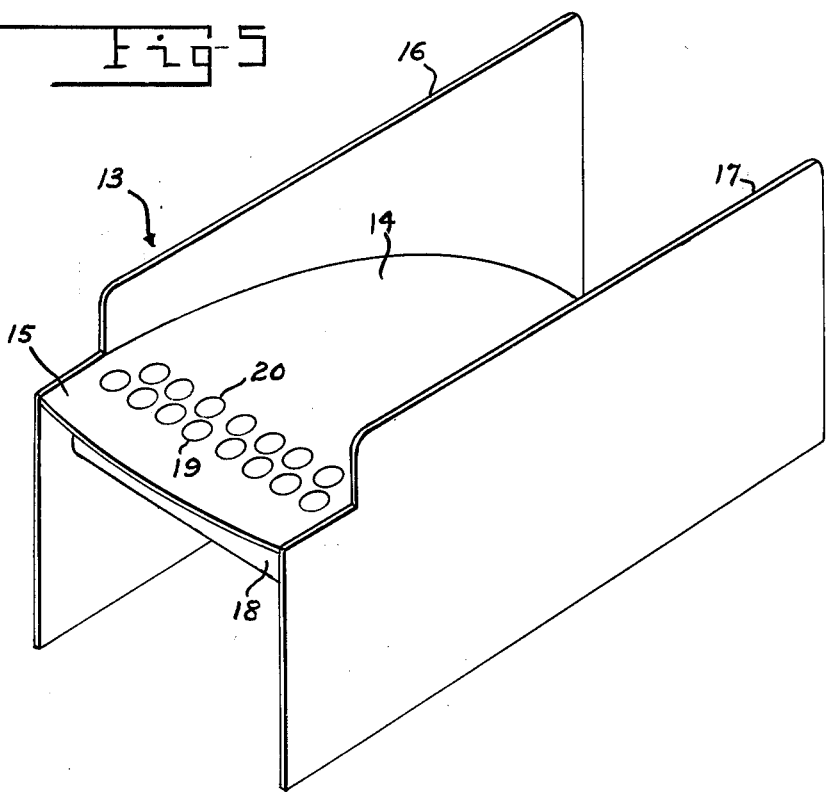

JET ENGINE TAIL PIPE FLOW DEFLECTOR

RIGHTS OF THE GOVERNMENT

The invention described herein may be manufactured and used by or for the Government of the United States for all governmental purposes without the payment of any royalty.

BACKGROUND OF THE INVENTION

This invention relates to jet engines and in particular to the production of thrust components at right angles to the main thrust direction of the engine. The invention also relates to jet aircraft employing air cushion takeoff and landing systems and particularly to the directional control of such aircraft when being taxied and during that part of the takeoff or landing run where the speed is below the speed at which the aerodynamic control surfaces are effective.

Since aircraft equipped with air cushion systems have no wheels, the usual methods of low speed directional control on the ground, such as a steerable nose wheel of differential braking of the main wheels, are not available. One steering method that has been used employs roll induced yaw to control the aircraft direction indirectly. Rotation of the aircraft about its roll axis is accomplished in this method by small wing tip thrusters which operate in opposite directions to produce the desired roll moment. Each thruster has upwardly directed and downwardly directed output channels and is supplied with compressed air from a single conduit extending through the wing from a suitable source of pressurized air in the aircraft, such as the jet engine compressor. Remotely controlled means are provided at each thruster to switch the air flow to either the upward channel or the downward channel to control the direction of the roll moment.

SUMMARY OF THE INVENTION

It is the purpose of the invention to provide a method of producing a thrust component at right angles to the main thrust direction of a jet engine that is simple, light weight, relatively inexpensive and has no moving parts in the jet stream. More specifically, it is the purpose of the invention to provide means for the direct control of a jet powered aircraft in yaw or pitch, or for instantaneously reducing the thrust of the engine. A particular purpose of the invention is to provide yaw control for an aircraft having an air cushion takeoff and landing system during taxiing or during that part of the takeoff or landing run where the air speed is below that at which the aerodynamic control surfaces become effective.

Briefly, the desired thrust component is produced by deflecting apparatus positioned at the edge of the jet engine tail pipe and providing a surface, bounded by side walls normal to the surface, that curves outwardly from the axial direction of the engine from tangency thereto at the tail pipe edge. A series of control ports extend across the curved surface near the tail pipe edge. These open into a chamber which in turn is connected through a suitable conduit and air valve to ambient air.

When the control ports are cut off from ambient air by closure of the air valve, the portion of jet stream adjacent the curved surface breaks away from the main stream and follows the curved surface because of the Coanda effect. This produces a component of thrust normal to the main stream direction. Opening of the control ports to ambient air by opening the air valves destroys the Coanda effect and allows the deflected stream to return to the normal axial direction.

For yaw control, two of the above described deflectors are positioned at opposite ends of the diameter of the tail pipe orifice that is normal to the yaw axis. Right-left control is exercised by differential operation of the air valves. For pitch control, two deflectors are situated at opposite ends of the diameter of the tail pipe orifice that is normal to the pitch axis, the up-down nose attitude control being accomplished through differential actuation of the air valves. Axial thrust reduction may be accomplished by closing both air valves simulataneously, or all four air valves simultaneously where both yaw and pitch control are employed. In this case the yaw and/or pitch effects cancel but the axial thrust is reduced since the axial thrust component of the deflected streams is less than the axial thrust component of the undeflected streams.

BRIEF DESCRIPTION OF THE FIGURES

FIG. 4 is a sectional view of the deflectors of FIG. 3 taken at horizontal plane 4—4, FIG. 5 is a three-dimensional view of the deflector of FIGS. 3 and 4.

DETAILED DESCRIPTION

Figure 1:
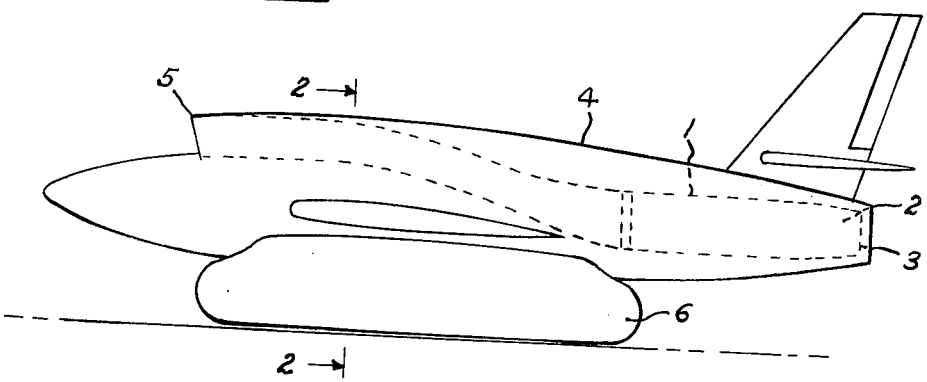
FIG. 1 is an elevation of a jet aircraft equipped with a typical air cushion takeoff and landing system with which the invention may be effectively employed.
Figure 2:
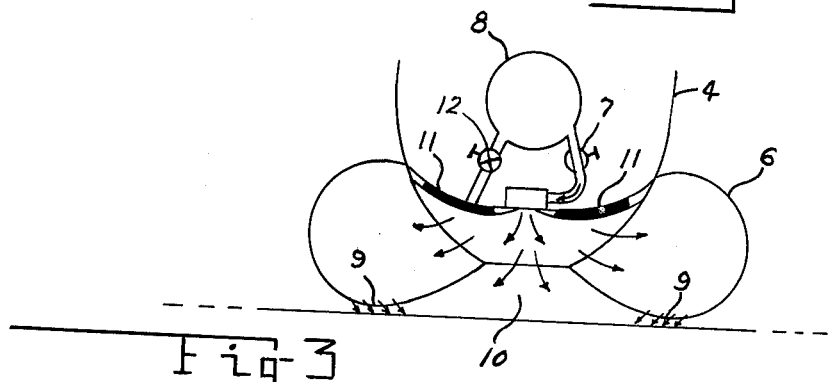
FIG. 2 is a partial sectional view, taken at transverse plane 2—2 in FIG. 1, showing schematically the construction of the air cushion system of FIG. 1.

FIG. 1 represents a typical jet powered aircraft equipped with an air cushion takeoff and landing system in lieu of wheels. Such systems permit aircraft to take off and land on surfaces that are too rough and uneven for conventional landing gear. The aircraft is shown as an unmanned RPV (remotely piloted vehicle) which is intended to be radio controlled through all phases of its operation; however, the invention is equally applicable to manned aircraft. The aircraft shown is powered by a single jet engine 1 having a tail pipe 2 and exit orifice 3. The engine is mounted in the fuselage 4 on the longitudinal axis of the vehicle and receives its air supply through air intake 5. The aircraft is supported on the ground by an air cushion system the trunk 6 of which is shown in FIG. 1. Referring to FIG. 2, which is a partial sectional view taken at plane 2—2 of FIG. 1, the trunk 6 is inflated through valve 7 from a suitable source 8 of pressurized air, such as the jet engine compressor. Air flow through holes 9 at the bottom of the trunk and pressure in the central cavity 10, cause the aircraft to be supported slightly above the ground on a cushion of air. In the system shown, trunk 6 is jettisoned after takeoff. A similar landing trunk 11 is stowed along the bottom of the fuselage and is inflated through valve 12 before landing.

Figure 3:
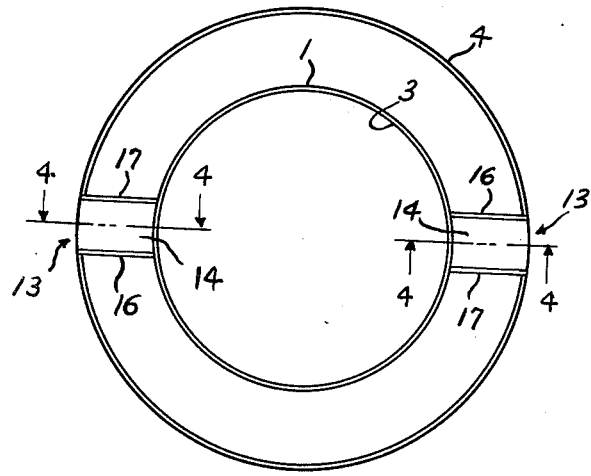
FIG. 3 shows deflectors in accordance with the invention installed for yaw control at the tail pipe of a jet powered aircraft.

FIG. 3 illustrates the application of the tail pipe flow deflectors 13 to a jet engine, such as that in the aircraft of FIG. 1, to obtain yaw control. For this control, the deflectors are placed at the opposite ends of that diameter of the tail pipe orifice 3 that is normal to the yaw axis. The construction of the deflectors, which are alike, is illustrated in FIGS. 4 and 5. As seen in FIG. 4, the tail pipe is substantially straight and not divergent, indicating that the jet stream is underexpanded and therefore subsonic rather than supersonic. The deflector provides a curved surface 14 which is tangent to the main jet stream at the orifice 3 of the tail pipe and curves outwardly as shown. The member 14 has a lip 15 which fits beneath the tail pipe 2 in close sliding contact therewith to allow for longitudinal expansion and contraction of the tail pipe. The lip may have a concave deformation to conform to the outside radius of the tail pipe opening. The curved surface is bounded by side walls 16 and 17 normal to the surface. Wall 18 forms an air tight chamber beneath the curved surface 14. This chamber communicates with the curved surface through two rows of control ports 19 and 20, and with outside ambient pressure through normally open air valve 21 which extends from the chamber through the wall of fuselage 4. When valve 21 is closed, ambient pressure is blocked from control ports 19 and 20. When open, ambient pressure is admitted to these ports. The air valve may be closed in any suitable manner, as by a rotary solenoid 22 energized through leads 23.

With valve 21 closed, blocking ambient pressure from control ports 19 and 20, the Coanda effect causes a part of the jet stream adjacent to the curved surface 14 to follow that surface and thus be deflected from the main stream direction. This produces a component of thrust normal to the main stream direction as represented by vector 24, where vector 25 represents the thrust of the deflected portion of the stream. At the same time, the axial component of the thrust represented by vector 26 has been reduced from the value represented by vector 25 which it had before deflection.

Figure 6:
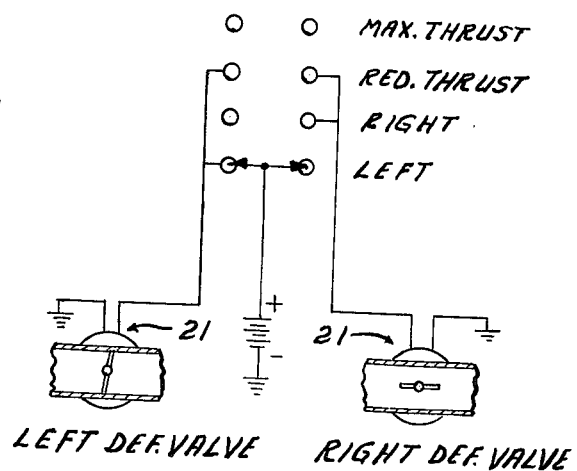
FIG. 6 is a schematic representation of a control system for the air valves associated with the deflectors.

FIG. 6 illustrates schematically an air valve control system providing for the four control situations possible in the yaw control system of FIG. 3. With the switch in the lowest position as shown, the valve for the left deflector is closed and that for the right deflector is open. This produces a left directed component of thrust, in the manner explained above, which results in a counterclockwise or left turning moment about the yaw axis. With the switch in the next upper position the situation is reversed and a clockwise or right turning moment is produced. In the third position up, equal left and right directed thrust components are produced. This produces no turning moment but reduces the axial thrust of the jet engine in the manner explained above. Finally, in the top position, neither deflector is operative and the jet engine produces its maximum axial thrust.

Operation for pitch control is similar in all respects to that for yaw except that the positions of the deflectors in FIG. 3 are rotated ninety degrees to the diameter of the tail pipe orifice that is normal to the pitch axis.

I claim:

1. In combination with a jet engine having a tail pipe terminating in an orifice through which a jet stream exits, a deflecting device for producing a component of thrust at right angles to the jet stream direction, said device comprising: means providing a transversely practically flat longitudinally curved surface, having a uniform width that is a small fraction of the circumference of said orifice and bounded by plane side walls normal to the surface, starting at the edge of the tail pipe orifice in a position of tangency to the jet stream and making an increasing outward angle with the jet stream direction, a series of control ports extending across said surface at the point of tangency; a normally open air valve connecting the control ports to outside ambient air; and means for closing said air valve to produce said component of thrust; said plane said walls extending radially into and beyond the inner radius of the tail pipe orifice and into the jet stream existing therefrom, thus defining the amount of jet stream to be deflected when the air valve is closed and shielding the portion of the jet stream to be deflected from the influence of the remainder of the jet stream on the outer sides of said plane side walls.

2. In combination with an aircraft having an air cushion takeoff and landing system and a jet engine with a tail pipe terminating in an orifice through which a jet stream for propelling the aircraft exits, apparatus for controlling said aircraft about one of its yaw and pitch axes particularly at air speeds below that at which the aerodynamic control surfaces of the aircraft become effective, said apparatus comprising a deflecting device as claimed in claim 1 located at each end of that orifice diameter that is normal to the said one axis.

3. Apparatus as claimed in claim 2 and in addition means for closing the air valves of the deflecting devices simultaneously to reduce the main thrust of the jet engine.

* * * * *